Oct. 18, 1966  W. C. MARTIN, JR., ETAL  3,279,967

METHOD OF FABRICATING A ROTOR SHROUD

Original Filed April 7, 1961

INVENTORS
WILLIAM C. MARTIN, JR.
BY HARRIS S. RUSH.

*Frederick E. McMullen*

ATTORNEY.

United States Patent Office 3,279,967
Patented Oct. 18, 1966

3,279,967
METHOD OF FABRICATING A ROTOR SHROUD
William C. Martin, Jr., Syracuse, and Harris S. Rush, Clay, N.Y., assignors to Carrier Corporation, Syracuse, N.Y., a corporation of Delaware
Original application Apr. 7, 1961, Ser. No. 101,579, now Patent No. 3,191,363, dated June 29, 1965. Divided and this application July 22, 1964, Ser. No. 389,234
4 Claims. (Cl. 156—172)

This invention relates to an apparatus for treating air and, more particularly, to an apparatus for treating air of the type generally used in air conditioning and air washing systems, wherein a rotating eliminator removes water particles from an air stream. This invention also relates to a novel eliminator structure and to a method for fabricating such eliminator structure. This application is a division of copending application, Serial No. 101,579, filed April 7, 1961, now Patent No. 3,191,363, issued June 29, 1965, for "Apparatus for Treating Air."

In the Ernest C. Hungate Patent No. 2,932,360, entitled "Apparatus for Treating Air," there is disclosed an apparatus for treating air which wholly departs from previous concepts of apparatus of this type. In the above-mentioned patent, the apparatus includes a casing having means for passing an air stream therethrough. Means are provided for placing the stream in direct contact with water, such means usually comprising a plurality of spray members capable of discharging finely divided particles of water into the air stream. A bladed rotor which functions as an eliminator is placed within the casing, usually adjacent the outlet, to remove entrained water particles from the discharge air stream. This eliminator may include a plurality of radially extending blades which have an annular enclosing means placed about the periphery of the bladed structure. These blades preferably are oriented in such a manner that the axial projections of the blades overlap.

The chief object of the present invention is to provide an improved apparatus for treating air.

A further object is to provide an improved eliminator structure for use in an apparatus for treating air.

Another object of this invention is to provide an improved and inexpensive bladed rotor construction.

A still further object of the invention is to provide a method for fabricating an improved bladed rotor. Other objects of the invention will be readily perceived from the following description.

This invention relates to an apparatus for treating air which comprises a casing, means for passing an air stream through the casing, means for placing the air stream in contact with a spray of water, a bladed eliminator for removing entrained water particles from the air stream, and means for rotatably mounting the eliminator, the eliminator having a shroud at least partially enclosing the periphery of the blades, the shroud being formed from a line wound about the blades, the adjacent turns of the line engaging one another, the line being connected to each blade at the extremity thereof.

This invention also relates to a bladed rotor comprising a rotatable hub, a plurality of blades secured to the hub and a shroud at least partially enclosing the periphery of the blades, the shroud being formed from a substantially continuous line treated with a self-extinguishing thermosetting resin to be described hereinafter.

This invention also relates to a method for fabricating a bladed rotor for use as an eliminator in an apparatus for treating air, the steps of which consist in attaching a plurality of blade members to a hub member, securing at least one line to a blade, rotating the hub member to wind the line onto the periphery of the blade members to form a shroud substantially enclosing the periphery of the blade members, and bonding the line to the ends of the blade members.

The attached drawing illustrates a preferred embodiment of the invention in which.

Figure 1:
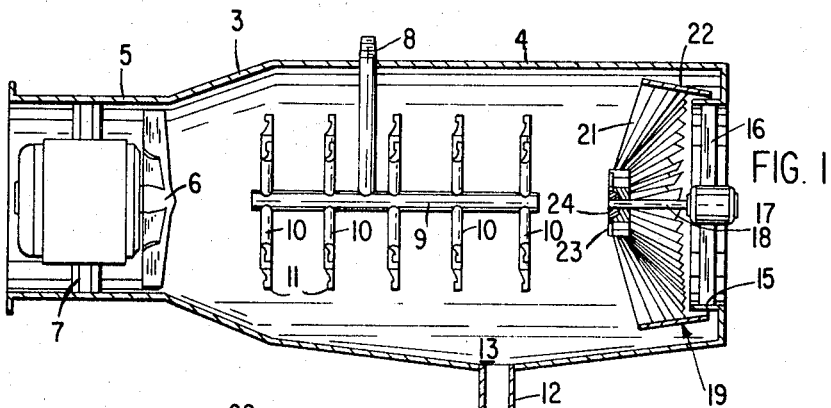
FIGURE 1 is a sectional view of the apparatus of the present invention.

Referring to the drawing, there is shown in FIGURE 1 an apparatus for treating air embodying the present invention. The apparatus includes a casing 3 which consists of a main section 4 and an inlet section 5 which is of a smaller diameter than the main section 4. Fan 6 is located in the inlet section and is mounted therein by means of suitable struts 7.

A water supply line 8 extends through the main section 4 and is connected to the supply header 9 which extends longitudinally within the main section 4. A plurality of banks of lines 10 extend from the supply head 9. Suitable nozzles 11 are located at the extremities of the individual lines 10. Drain 12 is located in the bottom portion of the main section 4 to remove water from the sump 13 of the unit.

At the end of the main section 4 is located an exit portion 15, wherein is mounted a suitable bearing 17. This bearing 17 is mounted by means of suitable struts 16. A shaft 18 is journalled within the bearing 17. Mounted on the shaft 18 is the bladed rotor 19, which is the eliminating device of the present apparatus.

This eliminator comprises a plurality of radially extending blades 21 which are attached to a novel frusto-conical shaped enclosing means or shroud 22. These blades cooperate with the surfaces of adjacent blades to define a plurality of zigzag passages through the bladed structure in a manner more fully described in the previously mentioned patent of Ernest C. Hungate.

Considering the operation of the apparatus, in FIGURE 1 air is induced through the casing 3 by means of the fan 6. As the air stream passes through the casing, water is passed into the line 8 through the spray header 9 and is discharged through the nozzles 11 thereby filling the main section 4 of the casing with a fine water spray. The humidity of the air and also the temperature of the air passing through the unit is affected by this relation with the water spray. As the air passes through the exit portion of the casing, it will tend to carry undesirable entrained water particles.

To remove these entrained water particles from the air stream, the eliminator structure 19 is provided. The bladed structure rotates and intercepts the water particles as it passes through the zigzag passages in the bladed structure and returns the water into the casing to be discharged through the drain 12. The operation of the apparatus in FIGURE 1 is fully described in the previously described patent of Ernest C. Hungate.

The blade members 21 comprise a plurality of surfaces which are angularly disposed with respect to one another. The blades are rigidly affixed to hub 23, which is secured to shaft 18 by suitable hub-mounting means 24, which may be of conventional design. A preferred manner of connecting the blades to the hub is described in the copending application of Richmond S. Hayes, Jr., Serial No. 791,914, filed February 9, 1959 now Patent No. 3,073,096, issued January 15, 1963.

In essence, the shroud 22 (FIGURE 2) is formed from one or more layers of line 25 wound onto the blade structure and suitably bonded thereto. The resultant eliminator has superior strength and the manufacturing cost thereof is substantially less than the cost of previous eliminators of this type.

In constructing the eliminator, first an eliminator subassembly 36 is fabricated. The blades are shaped as illustrated in the aforementioned Hungate patent. The outer edge of each blade 21 is smoothed along both the length and width thereof to prevent tearing or fracturing of the line in subsequent fabrication. The edge of each blade 21 may be mechanically rounded as by grinding. However a more satisfactory and expeditious method of effecting the same result is to dip the end of each blade into a thermo-setting resin to form a bead 26 thereon. Another manner of rounding the outer edge of each blade which would be apparent to those versed in the art would be to apply a molded blade tip cap. The blade members are secured to hub 23 to form the eliminator subassembly 36. This eliminator subassembly is mounted on shaft 37 (see FIGURE 3).

Figure 2:
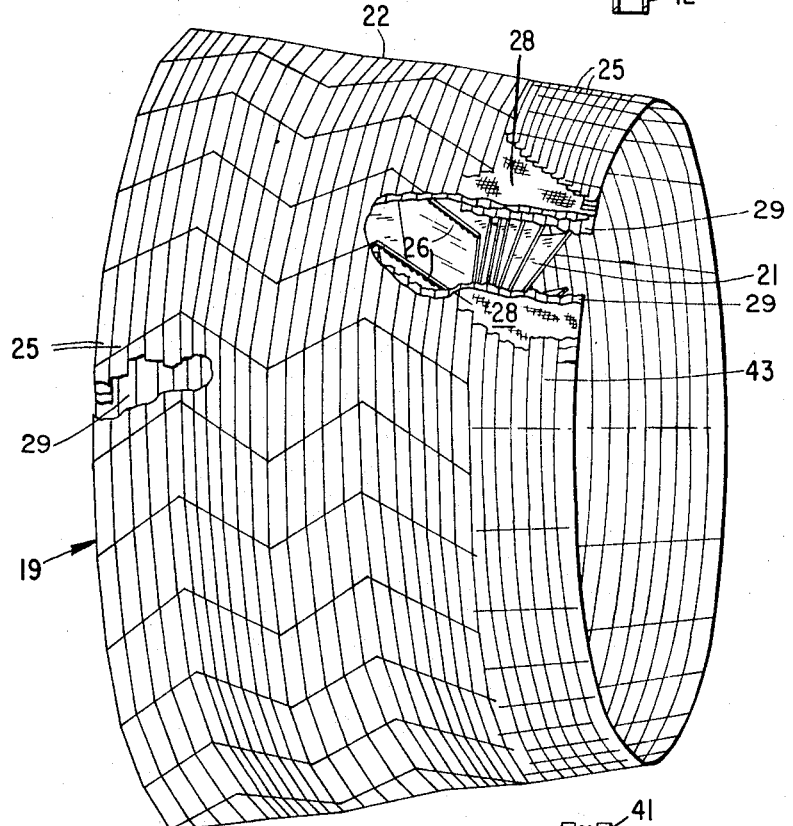
FIGURE 2 is a perspective view of the eliminator of the apparatus of FIGURE 1.
Figure 3:
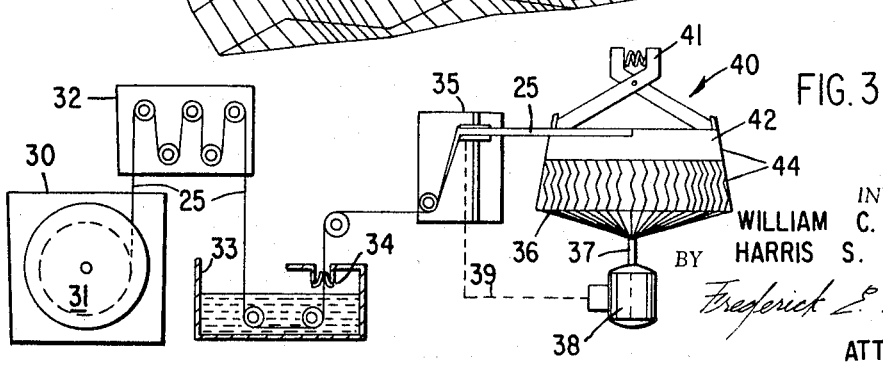
FIGURE 3 is a schematic diagram illustrating a method of fabricating the eliminator of the present invention.

Referring to FIGURES 2 and 3, a mandrel 40, is provided to support the portion of the line or filament forming that part of the shroud 22 overhanging one end of blades 21. Mandrel 40 includes a collapsible mandrel section 42 defining, when expanded, a surface conforming to the inner configuration of the shroud and adapted, when positioned adjacent the eliminator subassembly, to form, in cooperation with the outer peripheral surfaces of blades 21, a generally frusto-conical surface 44 as seen in FIGURE 3. Mandrel 40 is provided with a suitable actuating linkage 41 to enable mandrel section 42 to be expanded and contracted. The surface of the mandrel section 42 may be covered with a layer of material, as for example, tetrafluoroethylene, to prevent adherence of the resin-impregnated line. Actuating linkage 41 may be manually actuated or may be power actuated.

At the supply station 30 there is mounted a drum or spool 31 upon which is wound line or filament 25. The line or filament is preferably formed from glass fibers or filaments or tapes. Fibers or filaments or tapes made of nylon or polyester materials, for example "Dacron," (polyethylene terephthalic acid) may be used, as will be apparent to those persons skilled in the art. The glass fiber line or roving 25 extends through a tensioning mechanism 32 into the tank 33 containing the catalyzed thermosetting resin. A suitable resin is "Hetron 32," (fire retardant styrenated polyester resin) manufactured by Durez Plastics Division of Hooker Chemical Corporation.

As the filament or tape leaves the tank 33, the excess resin is wiped off at station 34 and returned to the tank. The filament extends through the feed mechanism 35 and is secured at one end of the eliminator subassembly mounted on the shaft 37. Shaft 37 is rotated by a suitable drive mechanism 38 which may include an electric motor and gear reduction mechanism.

The feed mechanism is operatively connected to the drive mechanism by suitable linkage 39.

An end of the filament is secured to the eliminator subassembly 36 to wind the filament onto the periphery of the eliminator structure, the drive mechanism is actuated to rotate shaft 37. The rotation of the eliminator structure will draw the filament from the spool 31 through the resin tank 33 wherein the filament will be impregnated with the resin. At wipe-off station 34, the excess resin will be removed. Feed mechanism 35 will regulate the winding of the filament onto the periphery of the blades. The filament may be wound so that adjacent turns contact one another at each side. An alternative method of winding the filament onto the periphery of the blades and the support member 40 is to cause adjacent turns of the filament to overlap one another. In this manner the first layer 29 of the shroud 22 is formed.

A backing material 28 made from woven fabric or roving is positioned over a portion of the blades and over a portion of the layer of filaments on the mandrel section 42 as shown in FIGURE 3 to provide longitudinal support for the portion of the completed shroud overhanging the blades.

A second layer 43 of resin-impregnated filament is wound over the first layer 29 and covers the backing material. For added strength, additional layers of filament may be wound on each end of the shroud as clearly seen in FIGURE 2.

When the resin sets, the collapsible support member is removed. The resultant eliminator is provided with a strong and rigid shroud.

This method of fabricating an eliminator or bladed rotor is simple and relatively inexpensive.

The connection between the blades and the shroud is in essence a bead which is smooth and obviates the adherance thereto of lint or other materials removed from the air stream by the eliminator structure.

We have, therefore, provided an improved eliminator structure for use in an apparatus for treating air. By the present invention, we have also provided a novel method for fabricating a rotary eliminator.

The present invention has been illustrated with particular reference to air treating apparatus. However, it is apparent that this type of structure may be used in other environments wherein it is desired to join blade members to a shroud in an inexpensive and simple structure.

While we have described a presently preferred embodiment of our invention, it will be understood that the invention is not limited thereto since it may be otherwise embodied within the scope of the claims.

We claim:

1. In a method for fabricating a bladed rotor, the steps which consist in attaching a plurality of blades to a hub member to form a subassembly, securing at least one filament to the subassembly, rotating the hub member to wind the filament onto the outer peripheral surfaces of the blades to form a shroud substantially enclosing the periphery of the blades, and bonding the filament to the outer peripheral surfaces of the blades.

2. In a method of fabricating a bladed rotor, the steps which consist in attaching a plurality of blades to a hub, fastening a resin-impregnated filament to one of the blades, rotating the hub and filament relative to one another to wind the filament onto the outer peripheral surfaces of the blades to form a shroud substantially enclosing the extremities of the blades, said shroud being bonded to the outer peripheral surface of each blade.

3. In a method of fabricating a bladed rotor, the steps which consist in rounding the outer peripheral surface of each of a plurality of blade members, securing a plurality of said blade members to a hub member, securing a filament to a blade, impregnating the filament with a thermosetting resin, rotating the hub and filament relative to one another to wind said resin-impregnated filament onto the blades to form an enclosure substantially encasing the outer extremities of the blades and curing the resin to bond the filament to the outer peripheral surfaces of the blades.

4. In a method for fabricating a bladed rotor, the steps which consist in securing a plurality of blades to a hub, impregnating a filament with a thermosetting resin, winding a first layer of filament onto the outer peripheral edges of the blades while supporting temporarily a portion of said first layer unsupported by the blades, positioning a woven fabric backing material on the unsupported portion of said first layer, winding a second layer of said filament over said first layer and said backing material, and curing the resin to bond said first layer to the outer peripheral edges of the blades and to bond said second layer and said backing material to said first layer and to one another.

References Cited by the Examiner

UNITED STATES PATENTS

| | | | |
|---|---|---|---|
| 2,454,580 | 11/1948 | Thielemann | 29—156.8 |
| 2,814,329 | 11/1957 | Sitton | 156—189 |
| 2,961,053 | 11/1960 | Prewitt et al. | 156—213 XR |
| 3,073,096 | 1/1963 | Hayes | 55—257 |

EARL M. BERGERT, *Primary Examiner.*

P. DIER, *Assistant Examiner.*